United States Patent Office 3,528,751
Patented Sept. 15, 1970

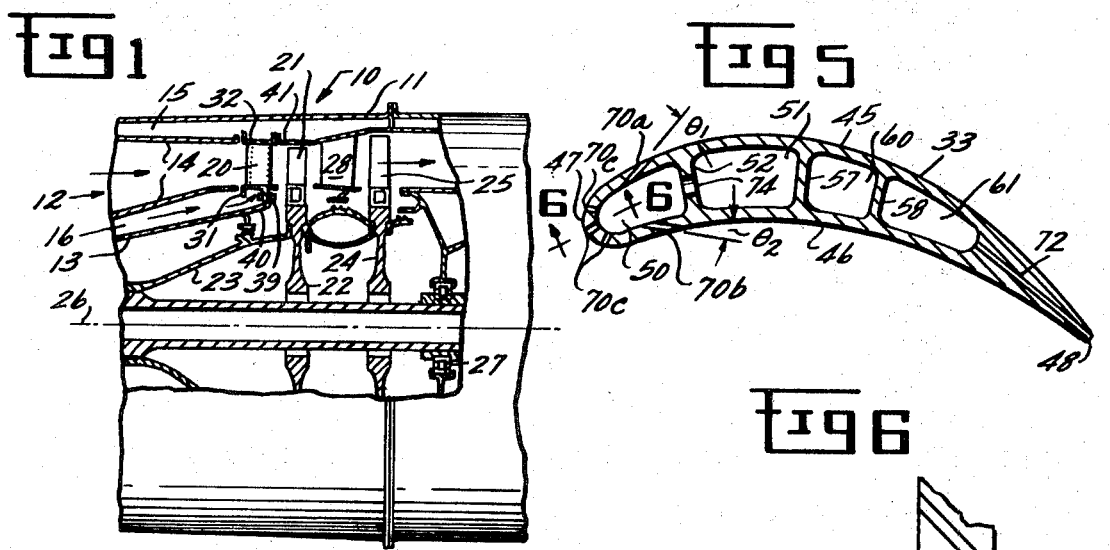

3,528,751
COOLED VANE STRUCTURE FOR HIGH TEMPERATURE TURBINE
Armando J. Quinones and David R. Davis, Cincinnati, Ohio, assignors to General Electric Company, a corporation of New York
Filed Feb. 26, 1966, Ser. No. 533,118
Int. Cl. F01d 25/12
U.S. Cl. 415—115                                10 Claims This invention relates to cooled blading for high temperature turbomachines and, more particularly, to a turbine vane construction having improved means for controlling and directing the flow of a cooling fluid through the interior and over the exterior surfaces of the vane.

It is well known that the efficiency of a gas turbine engine is related to the operating temperature of the turbine and that the efficiency may be increased, in theory, by increasing the operating temperature. As a practical matter, however, the maximum turbine operating temperature is limited by the high temperature capabilities of the various turbine elements. Since the engine efficiency is thus limited by temperature considerations, turbine designers have expended considerable effort toward increasing the high temperature capabilities of turbine elements, particularly the airfoil shaped vanes upon which high temperature combustion products impinge. Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements for vanes have been devised for extending the upper operating temperature limit by keeping the vane material at the lower temperatures which it is capable of withstanding without pitting or burning out. As used herein, the term "vane" is a generic term referring to airfoil-shaped elements used in high temperature turbomachines. As such, the term applies not only to those members popularly known as vanes, but also to other airfoil shaped members commonly known as blades, buckets, etc.

Cooling of vanes is generally accomplished by providing internal flow passages within the vanes to accommodate the flow of a cooling fluid, the fluid typically being compressed air bled from either the compressor or the combustor. It is also well known that the engine efficiency theoretically possible is reduced by the extraction of cooling air. It is therefore imperative that cooling air be utilized effectively, lest the decrease in efficiency caused by the extraction of the air be greater than the increase resulting from the higher turbine operating temperature. In other words, the cooling system must be efficient from the standpoint of minimizing the quantity of cooling air required. It is also essential that all portions of the turbine vanes be cooled adequately. In particular, adequate cooling must be provided for the leading and trailing edges of the vanes, these portions being most adversely affected by the high temperature combustion gases.

It has been found that cooling configurations available in the past have tended to have deficiencies with respect to the foregoing requirements. Cooling systems which use minimum quantities of cooling air commonly fail to cool adequately all portions of the vane. As a result, a critical portion such as the leading edge may crack, burn out, or pit after a relatively short operating period. On the other hand, those systems which adequately cool all portions of the vane, including the leading and trailing edges, commonly require too much air for efficient overall performance, the reason being that the cooling air is not used efficiently. For example, an inefficient arrangement may direct the cooling air through the interior of the vane in a manner which results in the creation of low convection heat transfer coefficients, or rates of heat transfer. Other characteristics, such as inadequate heat transfer area, can also prevent effective use of the cooling air.

It is therefore an object of this invention to provide for high temperature turbomachines an improved vane structure by which cooling fluid is utilized in a highly efficient manner.

It is anothre object of this invention to provide for high temperature turbomachines an improved vane structure by which all portions of the vane are cooled adequately.

Briefly stated, in carrying out the invention in one form, a vane for use in a high temperature turbomachine has a plenum formed therein adjacent the leading edge of the vane and inlet means for supplying cooling fluid, such as air, to the plenum. From the plenum, the cooling fluid is discharged through a multiplicity of passages interconnecting the plenum and the exterior vane surfaces in the leading edge region, the passages being disposed along axes forming acute angles with the exterior surfaces such that the cooling fluid discharged from the passages forms a thin layer of cooling fluid on the exterior wall surfaces to provide film cooling. More particularly, these passages are disposed such that cooling fluid ejected along the convex and concave side walls in the leading edge region is directed along the walls toward the trailing edge of the vane and such that cooling fluid ejected at the leading edge is directed radially along the leading edge. Moreover, the angular disposition of the passages provides extended convection heat transfer area in the leading edge region. In addition, cooling at the critical leading edge region is enhanced by impingement cooling. Specifically, throttling means accelerates cooling fluid within the plenum and directs the accelerated fluid against the interior wall surfaces in the leading edge region of the vane. The turbulence thus introduced into the cooling fluid results in high rates, or coefficients, of convection heat transfer at the leading edge.

By still further aspects of the invention, efficient and adequate cooling is provided also at the critical trailing edge region and at the midchord region of the vane. More particularly, a serpentine passage is formed in the vane interior between the plenum and the trailing edge, the midchord region being cooled efficiently and adequately by convention heat transfer to the cooling fluid flowing through the serpentine passage. After cooling the midchord region, the cooling fluid is discharged through a multiplicity of radially spaced passages interconnecting the serpentine passage and the trailing edge. The radially space passages, which provide a concentration of convection surfaces, assure adequate cooling in the trailing edge region.

While the novel features of this invention are set forth with particularity in the appended claims, the invention, both as to organization and content, will be better understood and appreciated, along with other objects and features thereof, from the following detailed description taken in conjunction with the drawing, in which:

FIG. 1 is a sectional view of a portion of a gas turbine engine having a turbine nozzle diaphragm incorporating the present invention;

FIG. 2 is a pictorial view of a portion of the annular nozzle diaphragm of FIG. 1;

FIG. 3 is a pictorial view, partially cut away, of one of the vanes comprising the nozzle diaphragm;

FIG. 4 is a view similar ot FIG. 3 showing the vane in longitudinal section;

FIG. 5 is a view showing the vane in transverse section; and

FIG. 6 is a view taken along viewing line 6—6 of FIG. 5.

Referring to the drawings, and particularly to FIG. 1, the high temperature portions of an axial flow gas turbine engine 10 are illustrated, the engine having an outer cylindrical casing 11 circumferentially surrounding the high temperature portions. The illustrated gas turbine structure includes an annular combustion space indicated generally by 12, the combustion space 12 being formed between the cylindrical casing 11 and an inner wall 13. An annular combustion liner 14 is located within the space 12 in spaced relation to the casing 11 and the wall 13, the actual combustion occurring within the annular combustion liner 14. The annular spaces 15 and 16 between the combustion liner 14 and the casing 11 and the wall 13 respectively, are filled with high pressure air discharged by the compressor (not shown). This high pressure air, which is quite cool relative to the high temperature combustion gasses within the combustion line 14, is admitted in a controlled manner to the interior of the combustion liner to support combustion and provide cooling therein. In accordance with the present invention, this relatively cool air is also used for cooling certain turbine elements exposed to the high temperature combustion products.

An annular nozzle diaphragm indicated generally by 20 in FIG. 1 is located at the downstream end of the combustion liner 14 for supplying the hot products of combustion to a row of turbine buckets 21 at the proper velocity and at the proper angle. The turbine buckets 21 are peripherally mounted on a turbine wheel 22 which, along with its associated shaft 23 and a second turbine wheel 24 having buckets 25 mounted thereon, is rotatably mounted on the engine axis 26 by suitable mounting means including a bearing arrangement 27. The turbine unit comprising the wheels 22 and 24 and the shaft 23 drives the compressor (not shown) of the engine 10.

With reference now directed to FIGS. 1 and 2, it will be noted that the entire flow of combustion products passes through the annular nozzle diaphragms 20 and 28 and over the rows of turbine buckets 21 and 25. If the gas turbine engine 10 is to operate at the efficiency and power levels desired in modern gas turbine engines, the combustion products must be discharged from the combustion liner 14 at temperatures higher than those which can be withstood without cooling by vanes made of currently available materials. The present invention makes this desired efficiency possible by providing adequate cooling in a highly efficient manner for all vane portions. In the illustrated embodiment, the cooling arrangement of the invention is applied only to the vanes 30 of the nozzle diaphragm 20, but it will become clear as this description proceeds that the invention could be utilized in conjunction with either the nozzle diaphragm 28 or the turbine buckets 21 and 25.

Before turning attention to the precise manner by which the present invention controls and directs the flow of cooling fluid through the interior and over the exterior surfaces of the vanes 30, it will be well to describe briefly the general arrangement and construction of the illustrated nozzle diaphragm 20. Specifically, although the nozzle diaphragm 20 functions as a unitary, annular structure comprising a plurality of circumferentially spaced airfoil shaped vanes 30 extending radially between an inner annular band 31 and an outer annular band 32, it is actually formed of a number of interlocking sections. More particularly, each section is formed as a single entity including a vane body 33 and inner and outer arcuate band segments 34 and 35 formed integrally therewith, one of the sections being illustrated by FIG. 3. A support flange segment 36 is also formed as an integral portion of the section. When assembled, adjacent ones of the band segments 34 and 35 fit together by suitable tongue and groove connections 37 as illustrated by FIG. 2 to form the complete annular nozzle diaphragm structure of FIG. 1, the flange segments 36 forming an annular support flange 38 which may be secured by bolts 39 to an engine support cone 40. With the annular support flange 38 secured to the support cone 40 and the outer band 32 abutting an annular shroud 41 peripherally surrounding the row of turbine buckets 21 the annular nozzle diaphragm 20 is located in a fixed position since the pressure forces acting thereon during engine operation hold the outer band 32 against the shroud 41.

The vane body 33 of each vane 30 is an airfoil shaped member having an exterior convex side wall surface 45 and an exterior concave side wall surface 46 interconnecting axially spaced leading and trailing edges 47 and 48, respectively. As best shown by FIG. 5, the aerodynamic shape of the vane body 33 at the leading edge 47 is rounded and rather blunt while the trailing edge region is tapered and quite thin. To cool these critical leading and trailing edge regions, as well as the midchord region, in accordance with the present invention, each vane body 33 is formed with heat exchange passages therein as illustrated by FIGS. 3–6. More particularly, each diaphragm section has interior wall surfaces defining a plenum means including a first region 50 immediately adjacent the leading edge 47 of the vane body 33 and a second region 51 immediately downstream of the first region 50, the first and second radial regions 50 and 51 of the plenum being separated by a radial partition 52 and the outer end of the second region 51 being closed by an end plate 53. A serpentine passage is formed downstream of the second region 51 by radial partitions 57 and 58 dividing the interior of the vane body 33 into first and second radial passages 60 and 61, respectively, the end plate 53 closing the radially outer end of the passages 60 and 61. To provide the serpentine passage, the partition 57 does not quite extend to the inner band segment 34 so as to form an opening 62 communicating with the second region 51, and the partition 58 does not quite extend to the outer end plate 53 to form an opening 63 between the passages 60 and 61. To admit compressed air from the annular combustion space 16 for cooling the vane body 33 (see FIG. 1), an inlet opening 55 communicating with the second region 51 is provided in the inner band segment 34.

A multiplicity of passages 70 are provided in the leading edge region of the vane body 33, the illustrated vane having a row of radially spaced passages 70a interconnecting the first region 50 and the convex side wall surface 45, a row of radially spaced passages 70b interconnecting the first region 50 and the concave side wall surface 46, and three rows of radially spaced passages 70c interconnecting the first region 50 and the leading edge 47. These passages 70 have very small cross sectional areas, the diameters of the passages being in the order of 0.005 inch to 0.025 inch, and are disposed along axes forming acute angles with the exterior wall surfaces. In the illustrated embodiment, the axes of the passages 70a form an arcuate angle $\theta_1$ of preferably less than 30° with the convex side wall surface 45 and the axes of the passages 70b form a similar acute angle $\theta_2$ of preferably less than 30° with the concave side wall surface 46. In addition, the passages 70a and 70b are disposed such that cooling fluid discharged from the plenum through the passages flows axially downstream along the wall surfaces toward the trailing edge 48. Similarly, as best shown by FIG. 6, the axes of the passages 70c form an acute angle $\theta_3$ of approximately 45° with the leading edge 47, the passages being disposed such that cooling fluid discharged from the passages 70c flows radially outward along the leading edge 47. The function of the passages 70 and the reasons for their particular orientation will become apparent as this description proceeds.

A multiplicity of passages 72 are also provided in the tapered and thin trailing edge region, the radially spaced passages 72 extending axially between the radial passage 61 and substantially the entire trailing edge 48. These closely spaced passages are also of very small diameter. To complete the description, it should be noted that the radial partition 52 has a plurality of relatively small throttling openings 74 therein for the purpose of providing communication between the first region 50 and the second region 51 of the plenum.

In operation, relative cool high pressure air from the combustion space 16 is admitted through the inlet opening 55 in the inner band segment 34 to the second region 51 of the plenum, the cooling air filling the second region 51 and flowing therefrom to the first radial region 50 through the openings 74 in the radial partition 52 and to the serpentine passage through the inlet opening 62. From the first region 50, the cooling fluid is discharged through the passages 70, and from the serpentine passage the cooling air is discharged through the passages 72.

The structural arrangement just described provides an adequate and extremely efficient cooling system. For example, at the leading edge region where cooling problems have heretofore been most acute, the present invention provides both convection and film cooling with the same cooling fluid. In addition, the convection cooling at the leading edge is greatly enhanced by impingement cooling and extended heat transfer area. By way of explanation, it is pointed out that the perforations or openings 72 in the radial partition 52 are throttling holes; since the openings 74 are sized to throttle the flow of cooling fluid, the fluid is accelerated as it flows between the second region 51 and the first region 50. As a result, the accelerated fluid strikes the inner vane surfaces in the leading edge region as a plurality of high velocity jets and thereby causes extreme turbulence and high heat transfer coefficients at the leading edge. This so-called impingement cooling thus causes high convection heat transfer rates at the leading edge. From the region 50 the cooling air is discharged through the openings 70 which, because of their angular orientation, provide much greater convection heat transfer area than would be present if the passages were normal to the wall surfaces. This extremely effective convection cooling is supplemented by film or boundary layer cooling since the angular orientation of the passages 70 causes the discharged cooling fluid to be trapped in the boundary layer and thereby form in thin layers on the exterior vane surfaces in the leading edge region, thus insulating the vane body 33 from the hot combustion products.

In the midchord region where the film of cooling fluid begins to separate from the convex and concave side wall surfaces 45 and 46, adequate cooling is provided by convection heat transfer to cooling fluid flowing through the second region 51 and the radial passages 60 and 61 of the serpentine passage. This particular arrangement for midchord cooling is quite satisfactory from an efficiency viewpoint since the same cooling fluid is used subsequently for cooling the leading and trailing edge regions.

In the critical trailing edge region, convection cooling is provided by cooling fluid flowing through the small diameter passages 72 extending axially between the radial passage 61 of the serpentine passage and the entire radial extent of the trailing edge 48. As in the case of the passages 70 in the leading edge region, the passages 74 provide a concentration of heat exchange area for extremely effective convention heat transfer.

To assure efficient utilization of cooling fluid, it is essential that the passages 70 in the leading edge region and the openings 74 in the trailing edge region permit sufficient, but not excessive, flow through the various portions of the vane body 33. This can be accomplished by controlling the number and individual flow areas of the passages and, of course, the pressure differential between the interior regions of the vane body and the static hot gas pressure on the exterior vane surfaces.

As pointed out above, the cooling arrangement of this invention is not limited to use in turbine nozzle diaphragms; it may of course be applied with equal utility to turbine buckets for gas turbine engines and to vanes utilized in other high temperature turbomachines, such as high pressure compressors. It will also be obvious to those skilled in the art that the general arrangement of this invention may be used if desired for related purposes, such as for anti-icing compressor inlet struts and vanes. It will also be obvious that the invention may be used in vanes formed differently than that of the illustrated diaphragm sections, which are of cast construction. For example, sheet metal inserts could be used for channelling the cooling fluid through the interior of the vane body. Similarly, the cooling fluid could be admitted through the outer band segment or through both band segments.

It will thus be seen that a vane structure constructed in accordance with this invention utilizes substantially the minimum amount of cooling fluid consistent with adequate cooling of all vane portions.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In an axial flow turbomachine, a vane comprising:
   a radially extending vane body having exterior wall surfaces including convex and concave side wall surfaces interconnecting axially spaced upstream leading and downstream trailing edges,
   interior wall surfaces forming plenum means within said vane body adjacent said leading edge,
   inlet means for admitting heat transfer fluid to said plenum means,
   throttling means within said plenum means for accelerating the heat transfer fluid and for directing the high velocity heat transfer fluid against the interior wall surfaces of said plenum means in the leading edge region of said vane body to generate high convection heat transfer coefficients at the leading edge,
   and outlet means comprising a multiplicity of passages in the leading edge region of said vane body interconnecting said plenum means and the exterior wall surfaces,
   said passages being disposed along axes forming acute angles with the exterior wall surfaces such that heat transfer fluid discharged from said plenum means through said passages forms a relatively thin layer of heat transfer fluid on the exterior wall surfaces in the leading edge region of said vane body.

2. A vane as defined by claim 1 in which said multiplicity of passages in the leading edge region of said vane body form at least one row of radially spaced openings in the convex side wall surface and at least one row of radially spaced openings in the concave side wall surface, the axes of the passages comprising said rows being disposed so as to direct heat transfer fluid discharged from the passages downstream toward the trailing edge of said vane body.

3. A vane as defined by claim 2 in which said multiplicity of passages in the leading edge region of said vane body further form at least one row of radially spaced openings at the leading edge, the axes of the passages comprising said row being disposed so as to direct heat transfer fluid discharged from the passages radially along the leading edge of said vane body.

4. A vane as defined by claim 3 in which said throttling means comprises a radially extending perforated partition dividing said plenum means into a first radially disposed region immediately adjacent said leading edge and a second radially disposed region axially downstream of said first region, said inlet means admitting heat transfer fluid to said second region, whereby heat transfer fluid is accelerated from said second region to said first region through the perforations in said radial partition.

5. In a high temperature, axial flow turbomachine, a vane comprising:

a radially extending vane body having exterior wall surfaces including convex and concave side wall surfaces interconnecting axially spaced upstream leading and downstream trailing edges, interior wall surfaces forming plenum means within said vane body adjacent the leading edge and a serpentine passage intermediate said plenum means and the trailing edge of said vane body, inlet means for admitting cooling fluid to said plenum means and said serpentine passage, and outlet means comprising a first multiplicity of passages in the leading edge region of said vane body interconnecting said plenum means and the exterior wall surfaces and a second multiplicity of passages in the trailing edge region of said vane body interconnecting said serpentine passage and the trailing edge for discharging cooling fluid from said plenum means and said serpentine passage, respectively, said multiplicity of passages in the leading edge region being disposed along axes forming acute angles with the exterior wall surfaces such that cooling fluid discharged from said plenum means forms a relatively thin layer of cooling fluid on the exterior wall surfaces in the leading edge region of said vane body.

6. A vane as defined by claim 5 in which the multiplicity of passages in the leading edge region of said vane body form a row of radially spaced openings in the convex side wall surface, a row of radially spaced openings in the concave side wall surface, and at least one row of radially spaced openings at the leading edge, the axes of the passages forming openings in said convex and concave side wall surfaces being disposed so as to direct cooling fluid discharged from the passages downstream toward the trailing edge and the axes of the passages forming openings at the leading edge being disposed so as to direct cooling fluid discharged from the passages radially along the leading edge of said vane body.

7. A vane as defined by claim 6 in which said plenum means includes a radially extending perforated partition dividing said plenum means into a first radially disposed region immediately adjacent said leading edge and a second radially disposed region axially downstream of said first region, the inlet means admitting cooling fluid to said second region, whereby cooling fluid flowing between said second and first regions is accelerated through the perforations in said radial partition and is directed with high velocity against the interior wall surfaces of said plenum means so as to generate high convection heat transfer coefficients at the leading edge of said vane body.

8. In a high temperature axial flow turbine, an annular turbine nozzle diaphragm comprising:

a plurality of circumferentially spaced, radially extending vanes, inner and outer band means circumferentially connecting the radially inner and outer ends, respectively, of said vanes, each of said vanes including a vane body having exterior wall surfaces including convex and concave side wall surfaces interconnecting axially spaced leading and trailing edges, said leading and trailing edges extending radially between said inner and outer band means, interior wall surfaces forming plenum means within said vane body adjacent said leading edge, inlet means for admitting cooling fluid through at least one of said band means to said plenum means, throttling means within said plenum means for accelerating the cooling fluid and for directing the high velocity cooling fluid against the interior wall surfaces of said plenum means in the leading edge region of said vane body to generate high convection heat transfer coefficients at the leading edge, and outlet means comprising radial rows of passages in the leading edge region of said vane body interconnecting said plenum means and the exterior wall surfaces, said radial rows of passages forming rows of openings in the convex side wall surface, the concave wall surface, and at the leading edge, the passages forming openings in said convex and concave side wall surfaces being disposed along axes forming acute angles with the side wall surfaces and being directed downstream toward the trailing edge such that cooling fluid discharged therefrom forms relatively thin layers of cooling fluid on said side wall surfaces in the leading edge region of said vane body, the passages forming openings at the leading edge being disposed along axes forming acute angles with the leading edge and being directed radially outward such that cooling fluid discharged therefrom forms a relatively thin layer of cooling fluid flowing radially outward along the leading edge of said vane body, whereby the leading edge regions of the vanes comprising the nozzle diaphragm are both film cooled and convection cooled, the convection cooling being further enhanced by high heat transfer coefficients generated by impingement of cooling fluid at the leading edge.

9. A turbine nozzle diaphragm as defined by claim 8 in which each of said vanes further includes:

interior wall surfaces forming a serpentine passage intermediate said plenum means and the trailing edge of said vane body, means interconnecting said plenum means and said serpentine passages for admitting cooling fluid to said serpentine passage from said plenum means, and a multiplicity of radially spaced, axially extending passages interconnecting said serpentine passage and the trailing edge of said vane for discharging cooling fluid from said serpentine passage to thereby cool the trailing edge region of said vane body.

10. A turbine nozzle diaphragm as defined by claim 9 in which said throttling means comprises a radially extending perforated partition dividing said plenum means into a first radially disposed region immediately adjacent said leading edge and a second radially disposed region axially downstream of said first region, the inlet means to said plenum means admitting cooling fluid to said second region, whereby cooling fluid flowing between said second and first regions is accelerated through the perforations in said radial partition and is directed with high velocity against the interior wall surfaces of said plenum means.

References Cited

UNITED STATES PATENTS

| | | | |
|---|---|---|---|
| 2,847,185 | 8/1958 | Petrie et al. | 415—115 |
| 3,420,502 | 1/1969 | Howald | 415—115 |

SAMUEL FEINBERG, Primary Examiner

U.S. Cl. X.R.

415—193; 416—97, 233